Jan. 4, 1944.  E. EGER  2,338,235
METHOD OF MAKING PUNCTURE SEALING INNER TUBES
Original Filed April 5, 1940
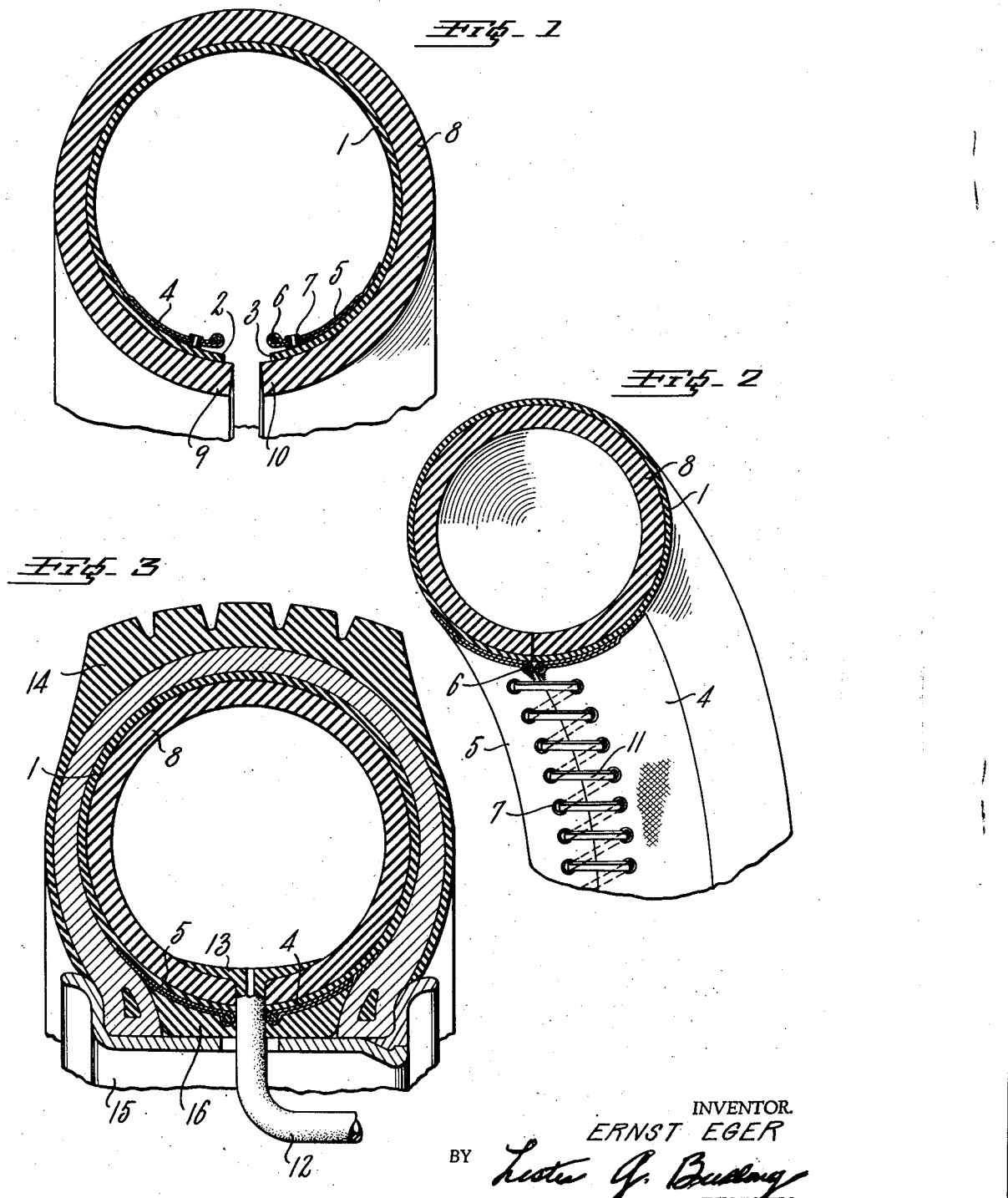
INVENTOR.
ERNST EGER
BY
ATTORNEY Patented Jan. 4, 1944

2,338,235

UNITED STATES PATENT OFFICE 2,338,235

METHOD OF MAKING PUNCTURE SEALING INNER TUBES

Ernst Eger, Grosse Pointe Park, Mich., assignor to United States Rubber Company, New York, N. Y., a corporation of New Jersey Original application April 5, 1940, Serial No. 327,979. Divided and this application August 29, 1940, Serial No. 354,669

2 Claims. (Cl. 154—15)

This invention relates to inner tubes for pneumatic tires and method of making the same, and is a division of my co-pending application Serial No. 327,979 filed April 5, 1940. More particularly, the invention relates to a method of making puncture sealing inner tubes which are adaptable for retaining air under compression, notwithstanding numerous and severe punctures produced by projectiles and the like.

In general, the invention comprises annular and tubular laminations of different rubber compositions assembled in a manner to provide substantial compression strains throughout the entire transverse and circumferential wall of one of the layers of rubber composition.

It is recognized that puncture sealing inner tubes have heretofore been manufactured, which tubes provide compression means in the region of the tread for sealing the tube against loss of air due to punctures resulting from the piercing of the tire tread by a nail or similar object. While the present puncture sealing tube is capable of retaining air, notwithstanding punctures such as ordinarily occur, it also includes the feature of being puncture-sealing throughout its entire transverse wall and, still further, it is capable of retaining air even though the puncture medium is relatively large. An inner tube having these qualifications is both different in function and construction from inner tubes of former construction.

Pneumatic tires are being more universally adopted in order to effect rapid transportation. For example, in implements of war, such as field artillery, transport trucks, and ambulances, pneumatic tires have been found far superior to solid tires or other forms of non-pneumatic wheels. When it is considered that implements such as field artillery require relatively large size tires, and when it is considered that a small projectile which penetrates such a tire renders the implement useless for conveyance, it is realized that an effective puncture sealing inner tube is of paramount importance in the use of the supporting pneumatic tires.

It is, therefore, among the objects of my invention to provide a puncture sealing inner tube capable of retaining air after numerous punctures; to provide a tube in which the puncture sealing quality will be effective throughout its entire transverse wall; to provide a puncture sealing inner tube which is not affected by the normal temperature ranges to which tires are subjected; to provide a puncture sealing inner tube which may be repaired; and to provide a puncture sealing inner tube which may be efficiently and economically manufactured.

These and other objects and advantages will appear more fully in the following detailed description when considered in connection with the accompanying drawing, in which:

Fig. 1 is a transverse view, in section, illustrating a manufacturing step in the construction of a puncture sealing tube of my invention;

Fig. 2 is a perspective view, partly in section, of a portion of a tube embodying the features of my invention, and Fig. 3 is a transverse view, in section, illustrating the application of an embodiment of my invention to a pneumatic tire, flap, and rim.

Referring to the drawing and, in particular, to Fig. 1, I show a puncture sealing inner tube in the process of manufacture. Essentially the invention comprises shaping a wall of rubber composition I to form an annular and substantially tubular member. This wall of rubber composition is in its unvulcanized state and is shaped in a manner to provide a separation or spacing between the marginal edges 2 and 3 of the wall I. These circumferentially extending margins lie at the rim or inner circumference of the tubular wall.

In the formation of an 8.25–20 inner tube, it is preferable that the gauge of the wall of rubber composition I be of the order of .150 inch. Also, the wall I is formed of a rubber composition of substantially stiff elasticity, such as a composition having the hardness of approximately 75 durometer. An example of a rubber composition having these preferred characteristics is as follows:

| | Parts by weight |
|---|---|
| Rubber | 100 |
| Accelerator | 2.25 |
| Retarder | .31 |
| Antioxidant | 1.00 |
| Zinc oxide | 5.00 |
| Carbon black | 42.25 |
| Pine tar | 2.00 |
| Stearic acid | 1.00 |
| Wax | 1.50 |
| Sulfur | 1.00 |

This stock is substantially similar to conventional inner tube stock. The sheet of rubber composition forming the wall I may be placed on any annular form which will give the wall I an annular and substantially tubular shape. Preferably the annular form should be somewhat similar to the conventional curing bag used for vulcanizing tires, in order to facilitate vulcanization of the assembly.

Attached to the inner surface of the wall 1 and in the region of the terminating marginal portions 2 and 3 are circumferentially extending fabric strips 4 and 5. Each of these strips is doubled back so as to provide a pocket for the retention of an inextensible annular member 6. These members may be in the form of a plurality of cords or may consist of one or more wires joined together to form an annulus. The purpose of the inextensible member 6 is to provide a reinforcing element at the marginal edges of the circumferentially extending strips of fabric 4 and 5.

A plurality of eyelets 7 are secured to the fabric strips 4 and 5 at spaced intervals extending circumferentially of the strips and located relatively close to the terminating margins of the strips which embody the inextensible reinforcing member 6. These strips of fabric 4 and 5 may be applied to the wall of rubber composition 1 prior to or during the application of the wall 1 to the form on which the materials are assembled. The fabric strips 4 and 5 are assembled with the wall 1 so that the reinforced ends of the fabric strips are substantially in alignment with the terminating margins 2 and 3 of the wall 1. A layer of insulating material, such as mica or soapstone, in dry form or in solution, is applied to the marginal regions 2 and 3 of the wall 1 to prevent the reinforced end portions of the fabric strips 4 and 5 from adhering to the surface of the wall 1. This operation allows the principal portion of the fabric strips 4 and 5 to become permanently vulcanized to the surface of the wall 1 and permits that portion of the fabric strips 4 and 5, which includes the reinforcing member 6 and the eyelets 7, to be free from adhesion with the surface of the wall 1.

Having assembled the fabric strips 4 and 5 and shaped the wall 1 into an annular and substantially tubular form, a second wall of rubber composition 8 is applied to the outer surface of the wall 1. The second wall completely encloses the wall 1 and includes marginal terminating portions 9 and 10 which overlap the marginal portions 2 and 3, respectively, of the wall 1. The second wall 8 is formed of a rubber composition having characteristics which differ materially from the composition of the wall 1. For example, the wall 8 is a very soft stock and may be identified by its softness as indicating a durometer reading of 15.

In the past, in order to obtain a relatively soft stock, it has been customary to employ an uncured rubber composition or a composition of a viscous or plastic nature. The present 15 durometer rubber composition is intended to be vulcanized in substantially the same manner as conventional vulcanized rubber compounds. The following is an example of a desirable compound which may be used for this purpose:

| | |
|---|---|
| Rubber | 3,000 |
| Softener | 240 |
| Ambrex D oil | 900 |
| Soft carbon black | 60 |
| Antioxidant | 30 |
| Sulfur | 90 |
| Accelerator | 33 |

In the formation of an 8.25–20 tube of this construction, I provide a thickness for the second wall 8 in the order of 7/8 inch. While such a thickness is preferable, I contemplate a thickness for the second wall 8 equal of at least 5 times the thickness of the wall 1.

When, as above described, all of the elements have been assembled as shown in Fig. 1, the unit is placed in a mold and subjected to vulcanization. In this operation the principal portions of the fabric strips 4 and 5 become permanently anchored to the wall of rubber composition 1, and the second wall 8 and the wall 1 become permanently bonded to form, in effect, a single wall embodying layers of different composition. After vulcanization, the unit is removed from the mold, and the assembly is inverted or turned inside out, causing the wall 1 to form the outer face of the finished tube. The tube in its inverted position is illustrated in Fig. 2.

In order to retain the inner tube in its inverted position, a lacing 11 is threaded through the eyelets 7, and the marginal portions of the walls 1 and 8 are drawn tightly together. Prior to the lacing operation, the adjacent or abutting surfaces of the marginal portions 2 and 3 and 9 and 10 are coated with a self-curing cement, so that as the marginal ends of the walls are held in abutted relationship, they adhere together to form a complete tubular member capable of retaining air when confined within a tire casing. The marginal portions 9 and 10 of the wall 8, which overlap the end portions 2 and 3 of the wall 1, are compressed together in the lacing operation to obtain the desired sealing effect.

As a result of the inverting operation, the wall 8, being of soft rubber, undergoes a substantial degree of compression, while at the same time, the wall 1 becomes extended slightly. This compression of the wall 8, in combination with the soft characteristics of the rubber composition, causes the composition, after it has been punctured or pierced, to seal the punctured area and prevent loss of air from within the inner tube.

Referring to Fig. 3, I show the inner tube of my invention assembled with a pneumatic tire and rim. I also show a valve stem 12 assembled with the inner tube. In this illustration a base 13, forming part of the valve stem 12, is cemented to the interior surface of the wall 8, immediately prior to cementing and joining the abutting edges of the marginal portions of the tube together. The stem portion 12 extends between the openings formed by the terminating margins of the walls 1 and 8, and the lacing operation secures the assembly in tight relationship. It is to be understood, however, that it is not necessary for the valve stem to extend between the margins formed by the walls 1 and 8 as, for example, the stem may be united to the inner tube assembly at other locations in the region of the rim area.

The assembly constituting the inner tube and valve stem, as shown in Fig. 3, is mounted in a pneumatic tire 14 and on a rim 15. A circumferential flap 16 is provided as a filler in the rim region of the assembly, in order to retain the inner tube in a substantially circular shape in cross section. It is desirable to maintain the inner tube in its original circular shape in order to preserve the initial strains imparted to the wall 8. It is also desirable for the inner tube to fit snugly within the tire casing 14 in order to preserve the strains in the entire inner tube assembly.

An 8.25–20 inner tube mounted within an 8.25–20 tire casing and inflated to 60 pounds pressure has been tested by subjecting the assembly to fire from a 30 caliber rifle. Each shot passed through the entire assembly, thus piercing both side walls of the tube. Fifteen 30 caliber projectiles were caused to pierce the assembly, including a group of five shots which pierced the assembly within an area of 1 square inch. After each shot the air pressure within the inner tube was gauged. After the 15th shot the air gauge indicated 58 pounds, a 2 pound loss, which loss is believed to be attributable to the escape of air when taking the pressure reading. After a period of 24 hours the air gauge still showed a pressure of 58 pounds. This test illustrates that an inner tube of my invention may be subjected to severe punishment from rifle fire without any substantial reduction in air pressure within the inner tube.

Tests have also been conducted at substantially high and low temperatures, in order to demonstrate that the rubber composition forming the wall 8, being of a vulcanized stock, is not affected by high or low temperatures as in the case of plastic or unvulcanized puncture sealing compounds.

From the foregoing description, it is believed apparent that I have provided a novel inner tube construction and method of making same which has demonstrated its outstanding importance in particular fields, and which has heretofore not been available nor disclosed in the prior art.

While I have thus shown and described a preferred embodiment of my invention, it is to be understood that it is susceptible of other modifications, and that such modifications are contemplated within the scope of my invention as appear within the appended claims.

Having thus described my invention, what I claim and desire to protect by Letters Patent is:

1. A method of forming a puncture sealing inner tube having a rim region adapted to be placed adjacent the rim of a wheel comprising the steps of shaping a wall of rubber composition to form an annular and substantially tubular member having circumferentially terminating margins lying in the rim region of the annular member, applying a circumferentially extending strip of fabric to the marginal portions of the wall, applying a layer of rubber composition to the entire exterior surface of said wall, vulcanizing the assembly, and inverting the assembly.

2. A method of forming a puncture sealing inner tube having a rim region adapted to be placed adjacent the rim of a wheel comprising the steps of shaping a wall of rubber composition to form an annular and substantially tubular member having circumferentially terminating margins lying in the rim region of the annular member, applying a circumferentially extending strip of fabric to the marginal portions of the wall, applying a layer of rubber composition to the entire exterior surface of said wall, vulcanizing the assembly, inverting the assembly, and joining the terminating margins of the wall to form a complete tubular member.

ERNST EGER.